US009167057B2

(12) United States Patent
Voto et al.

(10) Patent No.: US 9,167,057 B2
(45) Date of Patent: Oct. 20, 2015

(54) DUAL-MODE ENCODER, SYSTEM INCLUDING SAME, AND METHOD FOR GENERATING INFRA-RED SIGNALS

(75) Inventors: Robert Voto, Clarkston, MI (US); Steven Randlett, Clinton Township, MI (US)

(73) Assignee: Unwired Technology LLC, Woodbury, NY (US)

( * ) Notice: Subject to any disclaimer, the term of this patent is extended or adjusted under 35 U.S.C. 154(b) by 1136 days.

(21) Appl. No.: 13/069,046

(22) Filed: Mar. 22, 2011

(65) Prior Publication Data

US 2011/0231196 A1  Sep. 22, 2011

Related U.S. Application Data

(60) Provisional application No. 61/316,296, filed on Mar. 22, 2010.

(51) Int. Cl.
*H04R 1/10* (2006.01)
*H04L 29/06* (2006.01)
*G10L 19/18* (2013.01)
*H04S 1/00* (2006.01)
*G10L 19/16* (2013.01)
*G10H 1/00* (2006.01)

(52) U.S. Cl.
CPC .............. *H04L 69/18* (2013.01); *G10H 1/0083* (2013.01); *G10L 19/173* (2013.01); *G10L 19/18* (2013.01); *H04S 1/005* (2013.01)

(58) Field of Classification Search
CPC ..................................................... H04L 69/18
See application file for complete search history.

(56) References Cited

U.S. PATENT DOCUMENTS

| 4,418,416 | A | * | 11/1983 | Lese et al. ...................... 375/217 |
| 4,959,828 | A | * | 9/1990 | Austin .......................... 398/103 |
| 5,483,367 | A | * | 1/1996 | Han .............................. 398/115 |
| 5,602,669 | A | * | 2/1997 | Chaki ........................... 398/188 |
| 5,778,024 | A | * | 7/1998 | McDonough ................. 375/216 |
| 6,018,672 | A | * | 1/2000 | Werbus ....................... 455/575.1 |
| 6,185,627 | B1 | | 2/2001 | Baker et al. |
| 6,658,383 | B2 | | 12/2003 | Koishida et al. |

(Continued)

FOREIGN PATENT DOCUMENTS

| JP | 2003044097 | 2/2003 |
| JP | 2003087185 | 3/2003 |

(Continued)

OTHER PUBLICATIONS

International Search Report for corresponding International Application PCT/US11/029418, May 20, 2011.

(Continued)

*Primary Examiner* — Brian Albertalli
(74) *Attorney, Agent, or Firm* — Marc S. Kaufman; Stephen M. Hertzler; Reed Smith LLP (57) ABSTRACT

A dual-mode encoder. The encoder includes a logic device. The logic device includes a first input terminal for receiving a signal associated with an audio source, a second input terminal for receiving a mode instruction signal, and an output terminal for outputting an encoded signal. The logic device is configured to operate in a first mode by encoding the received associated signal according to a first protocol, and to operate in a second mode by encoding the received associated signal according to a second protocol.

18 Claims, 4 Drawing Sheets

(56) References Cited

U.S. PATENT DOCUMENTS

| | | |
|---|---|---|
| 7,076,204 B2 | 7/2006 | Richenstein et al. |
| 7,542,784 B2 * | 6/2009 | Passier et al. ............. 455/557 |
| 7,630,646 B2 * | 12/2009 | Anderson et al. ........... 398/132 |
| 7,757,258 B2 * | 7/2010 | Muench-Casanova et al. 725/75 |
| 7,864,928 B2 * | 1/2011 | Inoue ............................ 379/56.1 |
| 7,983,650 B2 | 7/2011 | Masuda |
| 8,204,539 B2 * | 6/2012 | Wu ............................... 455/556.1 |
| 2002/0128036 A1 * | 9/2002 | Yach et al. ..................... 455/552 |
| 2003/0023329 A1 | 1/2003 | Brooks, Jr. et al. |
| 2004/0073932 A1 * | 4/2004 | Lavelle et al. ................. 725/75 |
| 2004/0234081 A1 * | 11/2004 | Brice et al. ..................... 381/86 |
| 2005/0032500 A1 * | 2/2005 | Nashif et al. .................. 455/345 |
| 2007/0053533 A1 * | 3/2007 | Liow et al. .................... 381/311 |
| 2007/0123171 A1 * | 5/2007 | Slamka et al. ................ 455/66.1 |
| 2007/0212080 A1 * | 9/2007 | Meyer et al. .................. 398/202 |
| 2008/0112573 A1 * | 5/2008 | Huang ............................ 381/86 |
| 2008/0158001 A1 | 7/2008 | McCarty et al. |
| 2008/0188182 A1 * | 8/2008 | Macholz ....................... 455/66.1 |
| 2008/0212971 A1 * | 9/2008 | Shaanan et al. .............. 398/130 |
| 2008/0272649 A1 | 11/2008 | Order et al. |

FOREIGN PATENT DOCUMENTS

| | | |
|---|---|---|
| JP | 2006294120 | 10/2006 |
| JP | 2007266954 | 10/2007 |

OTHER PUBLICATIONS

Written Opinion of the International Search Report for corresponding International Application PCT/US11/029418, Mar. 20, 2011.

\* cited by examiner

DUAL-MODE ENCODER, SYSTEM INCLUDING SAME, AND METHOD FOR GENERATING INFRA-RED SIGNALS

CROSS-REFERENCE TO RELATED APPLICATION

This application claims the benefit under 35 U.S.C. §119 (e) of the earlier filing date of U.S. Provisional Patent Application No. 61/316,296 filed on Mar. 22, 2010.

BACKGROUND

This application discloses an invention which is related, generally and in various embodiments, to a dual-mode encoder, a system including the same, and a method for generating infra-red (IR) signals. Some of the generated IR signals are decodable by an analog headphone and other of the generated IR signals are decodable by a digital headphone.

At one time in the automotive industry, a vehicle came equipped with a single source of audio (e.g., a radio). When the audio source was turned on, the audio from the audio source was presented throughout the entire vehicle via one or more speakers connected to the audio source. Today, many vehicles come equipped with multiple sources of audio. Such audio sources may include a tuner, a CD player, a DVD player, a video game console, a satellite radio receiver, etc. When all of the vehicle occupants are listening to audio from a single audio source, the audio may be enjoyed throughout the vehicle without interference. However, when one of the vehicle occupants is listening to audio from one audio source and another of the vehicle occupants is listening to audio from another audio source, the two audios may overlap, thereby reducing the listening pleasure of all of the occupants.

To address this problem and meet the desires of many vehicle owners, more and more vehicles are now being equipped with the ability to transmit wireless signals, which are associated with one or more of the audio sources, to one or more headphones which are utilized by one or more of the vehicle occupants to enjoy audio from the different audio sources. This allows for audio from one audio source to be presented through the vehicle's speakers, and audio from another of audio sources to be presented through the headphones, thereby minimizing the potential overlap of the two audios.

There are essentially two different categories of headphones, those capable of receiving industry standard analog FM modulated audio signals, hereafter referred to as "analog headphones", and those capable of receiving digital signals, hereafter referred to as "digital headphones". For a typical automotive entertainment system which utilizes analog headphones, the audio signals generated by the audio source are input to a circuit which FM modulates certain known carrier frequencies and drives IR light emitting diodes (LEDs). While this operation is typically accomplished entirely with analog circuits it is also possible with mixed signal circuits. For example the audio signals input generated by the audio source are input to operational amplifier circuits for signal conditioning, the outputs of the operational amplifier circuits are input to analog-to-digital converter circuits, and the outputs of the analog-to-digital converter circuits are input to a digital encoder. The encoder employs frequency modulation to modulate the digital signals onto selected carrier frequencies. The output(s) of the encoder (i.e., the modulated signal) is then input to an IR emitter circuit(s). The IR emitter circuit converts the modulated signal into IR light, and the IR light (i.e., the wireless signal) is detected by the analog headphones. The analog headphones include a receiver which amplifies the wireless signal, demodulates it, and filters it to a frequency range suitable for the headphone user.

Although the above-described system mitigates the problem of overlapping audio, the performance of the system is often found to be less than desirable. For example, the fidelity of the audio presented to the headphone user is often worse than that of the vehicle's FM radio, and considerable background static and hiss become more noticeable as the volume of the presented audio is increased.

In general, automotive entertainment systems which utilize digital headphones offer superior performance. Some of the "digital" automotive entertainment systems typically allow for the concurrent transmission of wireless signals associated with a plurality of audio sources, and some of the digital headphones allow the headphone user to select which of the audio sources he or she wishes to listen to. However, because the analog automotive entertainment systems and the analog headphones currently have a lower initial cost than the digital counterparts, more vehicles still come equipped with the analog automotive entertainment systems and analog headphones than the digital counterparts despite the superior performance offered by the digital counterparts.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
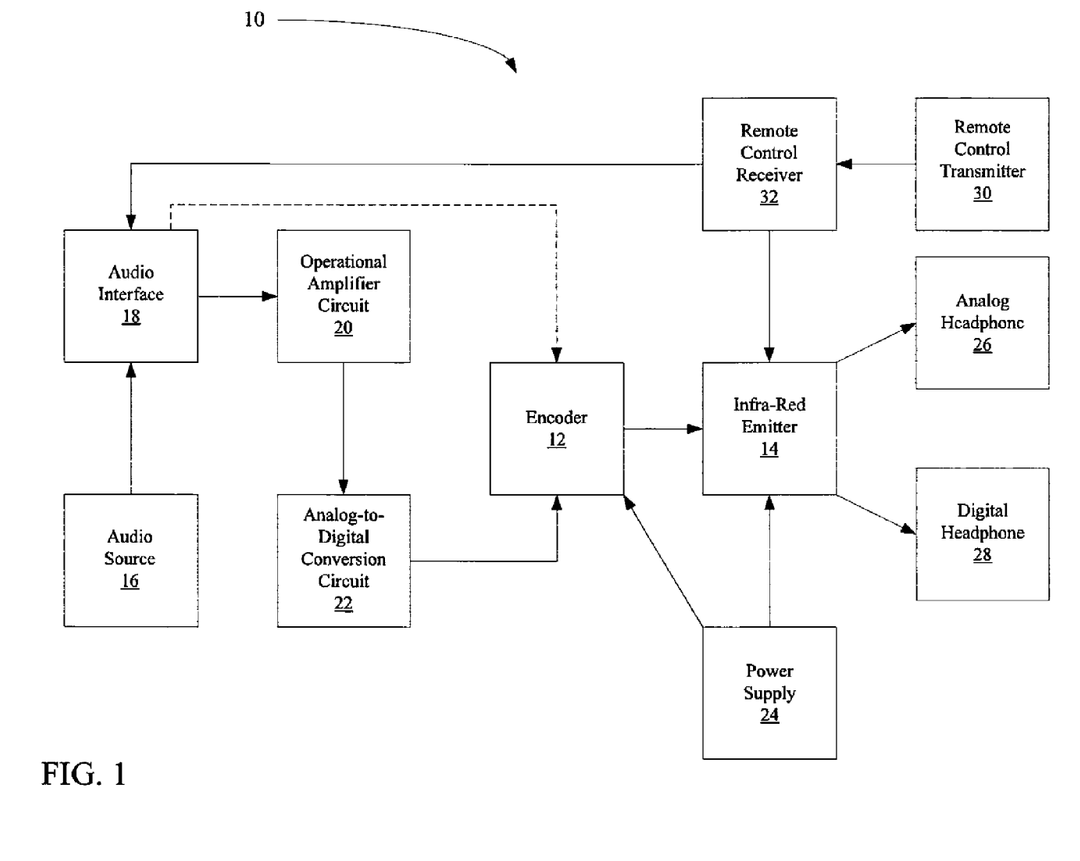
FIG. 1 illustrates a high level representation of various embodiments of a system.

FIG. 1 illustrates a high level representation of various embodiments of a system 10. The system 10 may be utilized to generate IR signals utilized by both analog and digital headphones. For purposes of simplicity, the system 10 will be described in the context of its use with automobiles. However, it will be appreciated that the system 10 may be utilized to generate IR signals utilized by both analog and digital headphones in a plurality of different environments.

The system 10 includes an encoder 12. The encoder 12 is a dual-mode encoder configured to receive digital signals representative of audio signals generated by one or more audio sources 16, then encode the received digital signals utilizing either a first mode of operation or a second mode of operation. The mode of operation (i.e., either the first mode or the second mode) employed by the encoder 12 is field switchable as described in more detail hereinbelow. According to various embodiments, the first mode of operation is employed when an analog headphone (e.g., analog headphone 26) is to be used by a vehicle occupant, and the second mode of operation is employed when a digital headphone (e.g., digital headphone 28) is to be used by a vehicle occupant.

The encoder 12 may be any suitable type of logic device. For example, according to various embodiments, the encoder 12 may be, for example, an application specific integrated circuit (ASIC), a complex programmable logic device (CPLD), a digital signal processor (DSP), a field-programmable gate array (FPGA), etc. According to various embodiments, aspects of the encoder 12 may be implemented by a computing device and/or a computer program stored on a computer-readable medium. The computer-readable medium may comprise a disk, a device, and/or a propagated signal.

Figure 2:
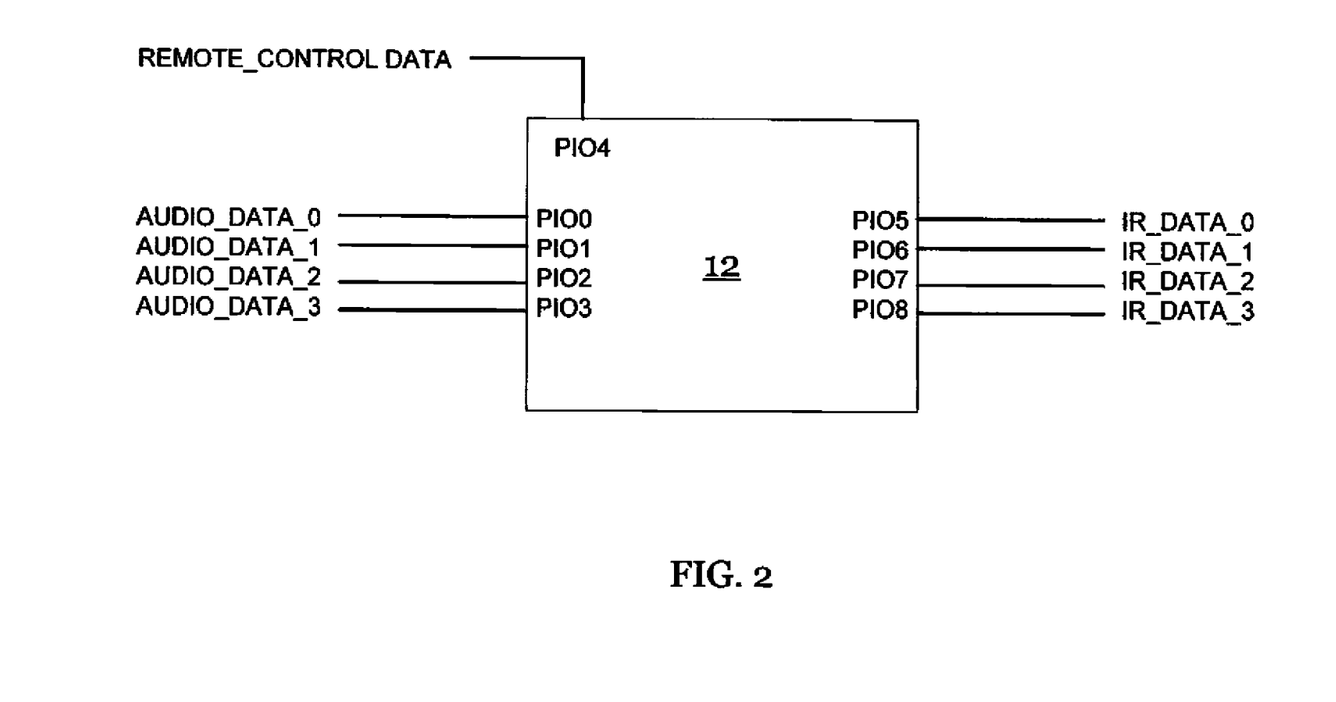
FIG. 2 illustrates various embodiments of an encoder of the system of FIG. 1.

FIG. 2 illustrates a high level representation of the encoder 12 according to various embodiments. Although the encoder 12 shown in FIG. 2 is a FPGA, it will be appreciated that according to other embodiments, the encoder 12 may be, for example, a ASIC, a CPLD, a DSP, etc. However, for purposes of simplicity, the FPGA embodiment of the encoder 12 will be described with reference to FIG. 2.

The FPGA may be programmed in a manner which permits the encoder 12 to operate in either the first mode or the second mode. According to various embodiments, the FPGA may also be programmed to recognize a specific signal generated by a remote control transmitter (e.g., remote control transmitter 30 of FIG. 1) and received from a remote control receiver (e.g., remote control receiver 32 of FIG. 1), and responsive to the specific signal, toggle the mode of operation from the first mode to the second mode, or from the second mode to the first mode. According to other embodiments, the FPGA may be programmed to recognize two distinct signals generated by a remote control transmitter (e.g., remote control transmitter 30) and received from a remote control receiver (e.g., remote control receiver 32). One of the distinct signals instructs the encoder 12 to operate in the first mode, and the other distinct signal instructs the encoder 12 to operate in the second mode. Therefore, it will be appreciated that a remote control transmitter (e.g., remote control transmitter 30) may be utilized to field switch the mode of operation employed by the encoder 12.

According to yet other embodiments, the FPGA may be programmed to recognize distinct signals from the vehicle's wiring logic and communication busses to control the mode of operation. For example, according to various embodiments, the distinct signals are originated at an audio source (e.g., audio source 16 of FIG. 1), then communicated to the encoder 12 via an audio source interface (e.g., audio source interface 20 of FIG. 1).

For the embodiments shown in FIG. 2, the FPGA includes four input terminals (PIO0-PIO3) shown at the left side of the FPGA for receiving audio input data signals, one terminal (PIO4) shown at the top left of the FPGA for receiving a mode instruction signal, and four output terminals (PIO5-PIO8) shown at the right side of the FPGA for outputting the encoded signals. Of course it will be appreciated that according to other embodiments, the FPGA may include any number of input terminals and any number of output terminals, including an input terminal for receiving distinct signals from the vehicle's wiring logic and communication busses to control the mode of operation of the encoder 12.

Returning to FIG. 1, according to various embodiments, the system 10 also includes one or more IR emitters 14 connected to the encoder 12. The IR emitters 14 may be implemented in any suitable manner. For example, according to various embodiments, the system 10 includes four IR emitters 14 connected to the encoder 12, and each of the four IR emitters 14 includes a circuit having four IR LEDs. According to other embodiments, the system 10 includes one IR emitter 14 connected to the encoder 12, and the one IR emitter 14 includes a circuit having sixteen IR LEDs. Although only one IR emitter 14 is shown in FIG. 1, it will be appreciated that the system 10 may include any number of IR emitters 14, and each IR emitter 14 may include any number of IR LEDs.

Figure 3:
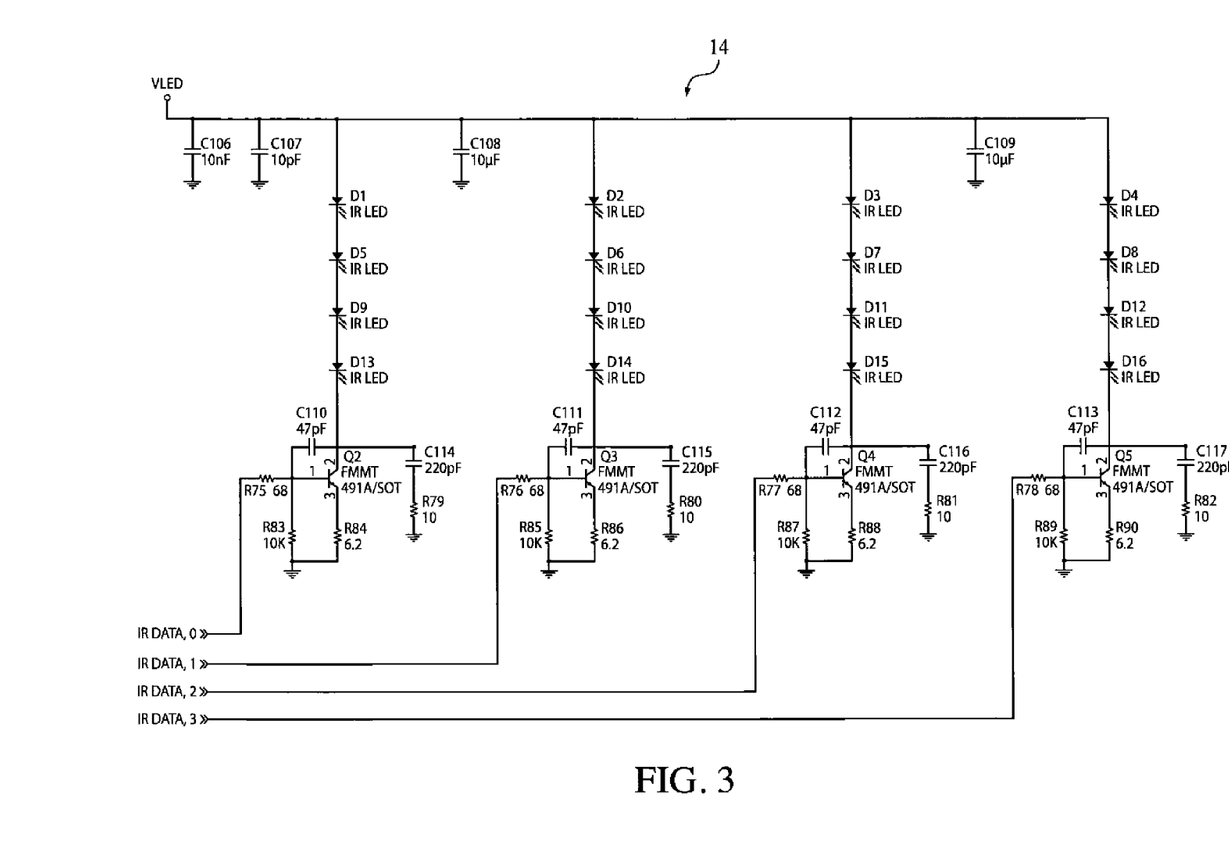
FIG. 3 illustrates various embodiments of an IR emitter of the system of FIG. 1.

FIG. 3 illustrates various embodiments of an IR emitter 14. When the encoder 12 is operating in the first mode, the encoder 12 encodes input signals according to a first protocol, and the signals encoded according to the first protocol are utilized to drive the IR LEDs of the IR emitter 14 on and off. Driving the IR LEDs on and off based on the signals encoded according to the first protocol generates a first digital data stream (IR signals) which is wirelessly transmitted, and the first digital data stream is suitable for use by an analog headphone (e.g., analog headphone 26). When the encoder 12 is operating in the second mode, the encoder 12 encodes input signals according to a second protocol, and the signals encoded according to the second protocol are utilized to drive the IR LEDs of the IR emitter 14 on and off. Driving the IR LEDs on and off based on the signals encoded according to the second protocol generates a second digital data stream (IR signals) which is wirelessly transmitted, and the second digital data stream is suitable for use by a digital headphone (e.g., digital headphone 28).

Returning to FIG. 1, according to various embodiments, the system 10 further includes one or more of the following components shown in FIG. 1: one or more audio sources 16, an audio source interface 18, one or more operational amplifier circuits 20, one or more analog-to-digital converter circuits 22, one or more power supply circuits 24, one or more analog headphones 26, one or more digital headphones 28, a remote control transmitter 30, and a remote control receiver 32. Although only one audio source 16, one operational amplifier circuit 20, one analog-to-digital converter circuit 22, one power supply circuit 24, one analog headphone 26 and one digital headphone 28 are shown in FIG. 1, it will be appreciated that according to various embodiments, the system 10 may include any number of such components. For example, the system 10 may include four IR emitters 14.

The audio sources 16 may be any suitable type of audio sources. The audio sources 16 may include analog and/or digital audio sources such as, for example, a tuner, a CD player, a DVD player, a video game console, a satellite radio receiver, an MP3 player, a digital audio player, etc.

The audio source interface 18 is connected to the audio sources 16, and provides a common physical location for all of the wires which carry the respective audio signals generated by the audio sources 16. As shown in FIG. 1, the audio interface 18 also is connected to the remote control receiver 32. According to various embodiments, depending on the specific signal received from the remote control receiver 32, the audio interface 18 may operate to prevent one or more of the audio signals from being forwarded to the one or more operational amplifier circuits 20. As shown by the dashed line in FIG. 1, the audio interface 18 may also be connected to the encoder 12, and may forward digital signals received from digital audio sources 16 directly to the encoder 12.

Each operational amplifier circuit 20 is connected to the audio interface 18, and operates to "condition" analog audio signals generated by an analog audio source 16 and received from the audio interface 18. The operational amplifier circuits 20 may be implemented in any suitable manner. For example, according to various embodiments, the system 10 includes four operational amplifier circuits 20 connected to the audio interface 18, and each operational amplifier circuit 20 is utilized to condition analog signals generated by a different analog audio source 16. According to other embodiments, the system 10 includes one operational amplifier circuit 20, the one operational amplifier circuit 20 includes four sub-circuits, and each sub-circuit is utilized to condition analog signals generated by a different analog audio source 16. It will be appreciated that for embodiments where the system 10 includes at least one analog audio source 16, the system 10 includes at least one operational amplifier circuit 20.

Each analog-to-digital converter circuit 22 is connected to an operational amplifier circuit 20, and operates to convert the analog signals received from the operational amplifier circuits 20 into digital signals representative of the audio signals generated by the analog audio sources 16. The analog-to-digital converter circuits 22 may be implemented in any suitable manner. For example, according to various embodiments, the system 10 includes four analog-to-digital converter circuits 22 connected to the one or more operational amplifier circuits 20, and each analog-to-digital converter circuit 22 is utilized to convert analog signals received from the one or more operational amplifier circuits 20 into digital signals representative of the audio signals generated by the analog audio sources 16. According to other embodiments, the system 10 includes one analog-to-digital converter circuit 22 connected to the one or more operational amplifier circuits 20, the one analog-to-digital converter circuit 22 includes four sub-circuits, and each sub-circuit is utilized to convert analog signals received from the one or more operational amplifier circuits 20 into digital signals representative of the audio signals generated by the analog audio sources 16. It will be appreciated that for embodiments where the system 10 includes at least one analog audio source 16 and at least one operational amplifier circuit 20, the system 10 also includes at least one analog-to-digital converter circuit 22.

As shown in FIG. 1, the power supply circuit 24 is connected to the encoder 12 and the IR emitters 14, and provides power thereto. For embodiments where the system 10 includes more than one IR emitter 14, the system 10 may include multiple power supply circuits 24, with each power supply circuit 24 being connected to a corresponding IR emitter 14. For embodiments of the system 10 which include at least one operational amplifier circuit 20 and at least one analog-to-digital converter circuit 22, the one or more power supply circuits 24 may also be connected to and provide power to these components. The one or more power supply circuits 24 may be implemented in any suitable manner. Although not shown in FIG. 1, it will be appreciated that the one or more power supply circuits 24 are also connected to a power source such as, for example, a battery.

Each analog headphone 26 is configured to receive the first digital data stream wirelessly transmitted by the IR emitter 14, decode the first digital data stream, demodulate the decoded data stream, and filter the demodulated data stream to a frequency range suitable for the headphone user. According to various embodiments, at least one of the analog headphones 26 includes a source selector switch. For such embodiments, in instances where an analog headphone 26 having the source selector switch receives a plurality of wirelessly transmitted digital data streams, the source selector switch may be utilized by a user of the analog headphone 26 to select which audio source he or she wishes to listen to via the analog headphone 26.

Each digital headphone 28 is configured to receive the second digital data stream wirelessly transmitted by the IR emitter 14, decode the wirelessly transmitted digital data stream, convert the decoded data stream to an analog data stream, and filter the analog data stream to a frequency range suitable for the headphone user. According to various embodiments, at least one of the digital headphones 28 includes a source selector switch. For such embodiments, in instances where a digital headphone 28 having the source selector switch receives a plurality of wirelessly transmitted digital data streams, the source selector switch may be utilized by a user of the digital headphone 28 to select which audio source he or she wishes to listen to via the digital headphone 28.

The remote control transmitter 30 may be utilized by the vehicle occupants to wirelessly communicate with the remote control transceiver 32. As described hereinabove, the remote control transmitter 30 may be utilized to toggle the mode of operation employed by the encoder 12. According to other embodiments, one or more of the audio sources 16 may be utilized by the vehicle occupants to toggle the mode of operation employed by the encoder 12.

The remote control transmitter 30 may also be utilized to prevent one or more of the audio signals generated by an audio source 16 from being forwarded from the audio interface 18 to the one or more operational amplifier circuits 20 and/or the encoder 12, thereby effectively preventing the audio signals from reaching the analog headphones 26 and/or the digital headphones 28.

In view of the foregoing, it will be appreciated that according to various embodiments, with the exception of the encoder 12, the system 10 may include the same components as a "standard" analog automotive entertainment system. Therefore, it will also be appreciated that the overall cost of the system 10 will be relatively close to the overall cost of the "standard" automotive entertainment system, while providing the flexibility of being suitable for use with both analog headphones and digital headphones.

Figure 4:
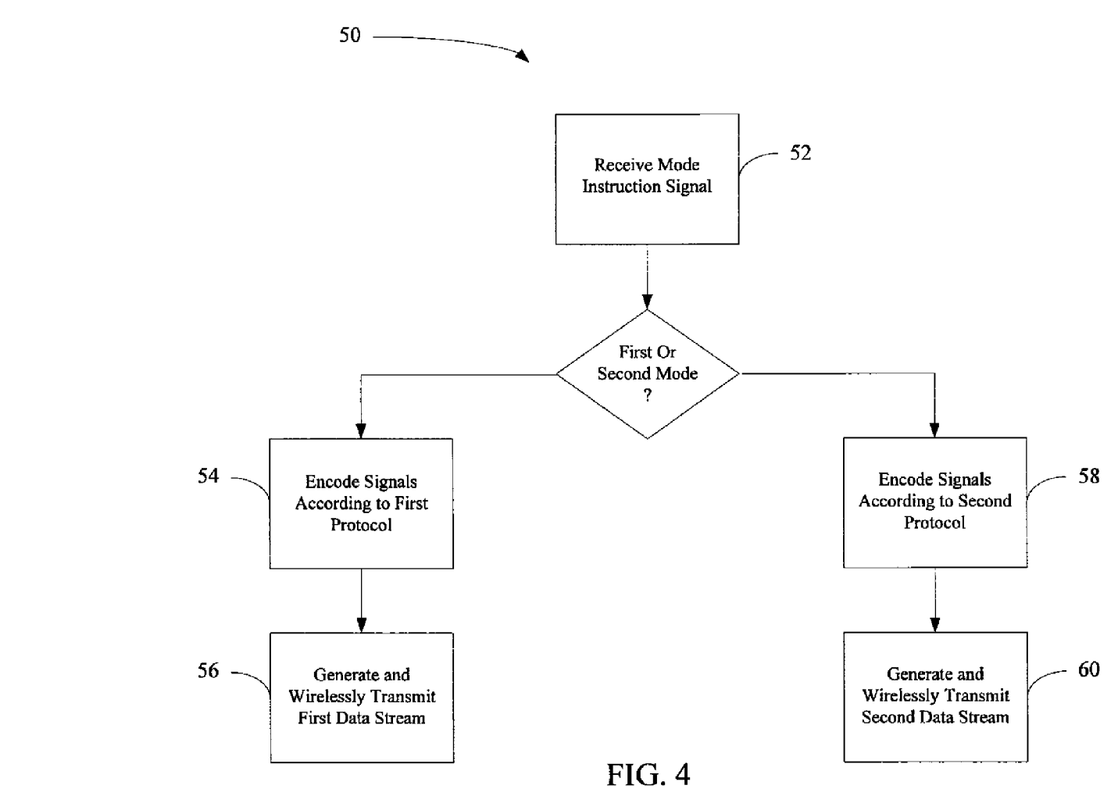
FIG. 4 illustrates various embodiments of a method for generating an IR signal.

FIG. 4 illustrates various embodiments of a method 50 for generating an IR signal. Of course, the method 50 may also be utilized to generate a plurality of IR signals. Some of the generated IR signals are decodable by an analog headphone and other of the generated IR signals are decodable by a digital headphone. The method 50 may be implemented by the system 10 of FIG. 1. For purposes of simplicity, the method 50 will be described in the context of being implemented by the system 10. However, it will be appreciated that the method 50 may be implemented by a system other than system 10.

The process starts at block 52, where a mode instruction signal is received by the encoder 12. According to various embodiments, the mode instruction signal may have been received from the remote control receiver 32 and generated by the remote control transmitter 30. According to other embodiments, the mode instruction signal may have been received via the audio interface 18 and generated by one of the audio sources 16. The received mode instruction signal operates to have the encoder 12 operate in either the first mode (i.e., a mode associated with an analog headphone) or the second mode (i.e., a mode associated with a digital headphone). According to various embodiments, the encoder 12 may be programmed to operate in a default mode (e.g., the first mode) until the mode selection signal is received, then switch to the second mode responsive to the received mode selection signal. Upon the receipt of a subsequent mode instruction signal, the encoder 12 may then switch back to the first mode and so on. According to other embodiments, the receipt of a first distinct mode instruction signal causes the encoder 12 to operate in the first mode and the receipt of a second distinct mode instruction signal causes the encoder 12 to operate in the second mode.

From block 52, the process advances to either block 54 or to block 58. If the mode instruction signal received by the encoder 12 at block 52 operates to have the encoder 12 operate in the first mode, the process advances from block 52 to block 54, where the encoder 12 encodes input signals representative of audio signals according to a first protocol, and outputs the encoded signals to the IR emitter 14.

From block 54, the process advances to block 56, where the IR emitter 14 receives the encoded signals. Responsive to the encoded signals, the IR LEDs of the IR emitter 14 are driven on and off, thereby generating a first digital data stream which is wirelessly transmitted. The first digital data stream is suitable for use with the analog headphone 26.

If the mode instruction signal received by the encoder 12 at block 52 operates to have the encoder 12 operate in the second mode, the process advances from block 52 to block 58, where the encoder 12 encodes input signals representative of audio signals according to a second protocol, and outputs the encoded signals to the IR emitter 14.

From block 58, the process advances to block 60, where the IR emitter 14 receives the encoded signals. Responsive to the encoded signals, the IR LEDs of the IR emitter 14 are driven on and off, thereby generating a second digital data stream which is wirelessly transmitted. The second digital data stream is suitable for use with the digital headphone 28.

In view of the above, it will be appreciated that depending on the mode of operation of the encoder 12, for a given input signal received by the encoder 12, the received signal may be encoded by the encoder 12 either according to the first protocol (then subsequently transmitted as an IR signal for use by an analog headset 26) or according to the second protocol (then subsequently transmitted as an IR signal for use by a digital headset 28).

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. An apparatus, comprising:
    a dual-mode encoder, wherein the dual-mode encoder comprises:
        a logic device, wherein the logic device comprises:
            a first input terminal for receiving a signal associated with an audio source;
            a second input terminal for receiving a mode instruction signal; and
            an output terminal for outputting an encoded infra-red signal,
        and wherein the logic device is configured to:
            operate in a first mode by encoding the received associated signal according to a first protocol; and
            operate in a second mode by encoding the received associated signal according to a second protocol.

2. The apparatus of claim 1, wherein the logic device comprises one of the following:
    an application specific integrated circuit;
    a complex programmable logic device;
    a digital signal processor; and
    a field-programmable gate array.

3. The apparatus of claim 1, wherein the logic device further comprises a plurality of input terminals, wherein different input terminals are for receiving different signals associated with different audio sources.

4. The apparatus of claim 1, wherein the logic device further comprises a plurality of output terminals, wherein different output terminals are for outputting different encoded infra-red signals.

5. The apparatus of claim 1, wherein:
    the encoded infra-red signal is decodable by an analog headphone if the encoded infra-red signal was encoded according to the first protocol; and
    the encoded infra-red signal is decodable by a digital headphone if the encoded infra-red signal was encoded according to the second protocol.

6. A system, comprising:
    a dual-mode encoder, wherein the dual-mode encoder comprises:
        a logic device, wherein the logic device comprises:
            a first input terminal for receiving a signal associated with an audio source;
            a second input terminal for receiving a mode instruction signal; and
            an output terminal for outputting an encoded signal,
        and wherein the logic device is configured to:
            operate in a first mode by encoding the received associated signal according to a first protocol; and
            operate in a second mode by encoding the received associated signal according to a second protocol; and
    an infra-red emitter connected to the dual-mode encoder.

7. The system of claim 6, wherein the logic device comprises one of the following:
    an application specific integrated circuit;
    a complex programmable logic device;
    a digital signal processor; and
    a field-programmable gate array.

8. The system of claim 6, wherein the infra-red emitter is configured to generate an infra-red signal based on the encoded signal output by the dual-mode encoder.

9. The system of claim 8, wherein the generated infra-red signal is decodable by an analog headphone if the encoded signal was encoded according to the first protocol.

10. The system of claim 8, wherein the generated infra-red signal is decodable by a digital headphone if the encoded signal was encoded according to the second protocol.

11. A method for generating an infra-red signal, the method comprising:
    operating dual-mode encoder in a first mode of operation;
    operating the dual-mode encoder in a second mode of operation if a mode instruction signal is received at the dual-mode encoder; and
    generating an infra-red signal with an infra-red emitter based on an encoded signal received from the dual-mode encoder, wherein the generated infra-red signal is decodable by:
        an analog headphone if the encoded signal was encoded while the dual-mode encoder was operating in the first mode; and
        a digital headphone if the encoded signal was encoded while the dual-mode encoder was operating in the second mode.

12. The method of claim 11, wherein operating the encoder in the first mode comprises encoding first signals according to a first protocol.

13. The method of claim 12, wherein operating the encoder in the second mode comprises encoding second signals according to a second protocol.

14. The method of claim 11, further comprising receiving the mode instruction signal at the encoder.

15. The method of claim 14, wherein receiving the mode instruction signal comprises receiving a mode instruction signal generated by a remote control transmitter.

16. The method of claim 15, wherein receiving the mode instruction signal generated by the remote control transmitter comprises receiving the mode instruction signal via a remote control receiver.

17. The method of claim 14, wherein receiving the mode instruction signal comprises receiving a mode instruction signal generated by an audio source.

18. The method of claim 17, wherein receiving the mode instruction signal generated by the audio source comprises receiving the mode instruction signal via an audio interface.

\* \* \* \* \*